Nov. 12, 1963  M. M. MILLS  3,110,656
EDUCATIONAL NUCLEAR REACTOR
Filed Feb. 11, 1959

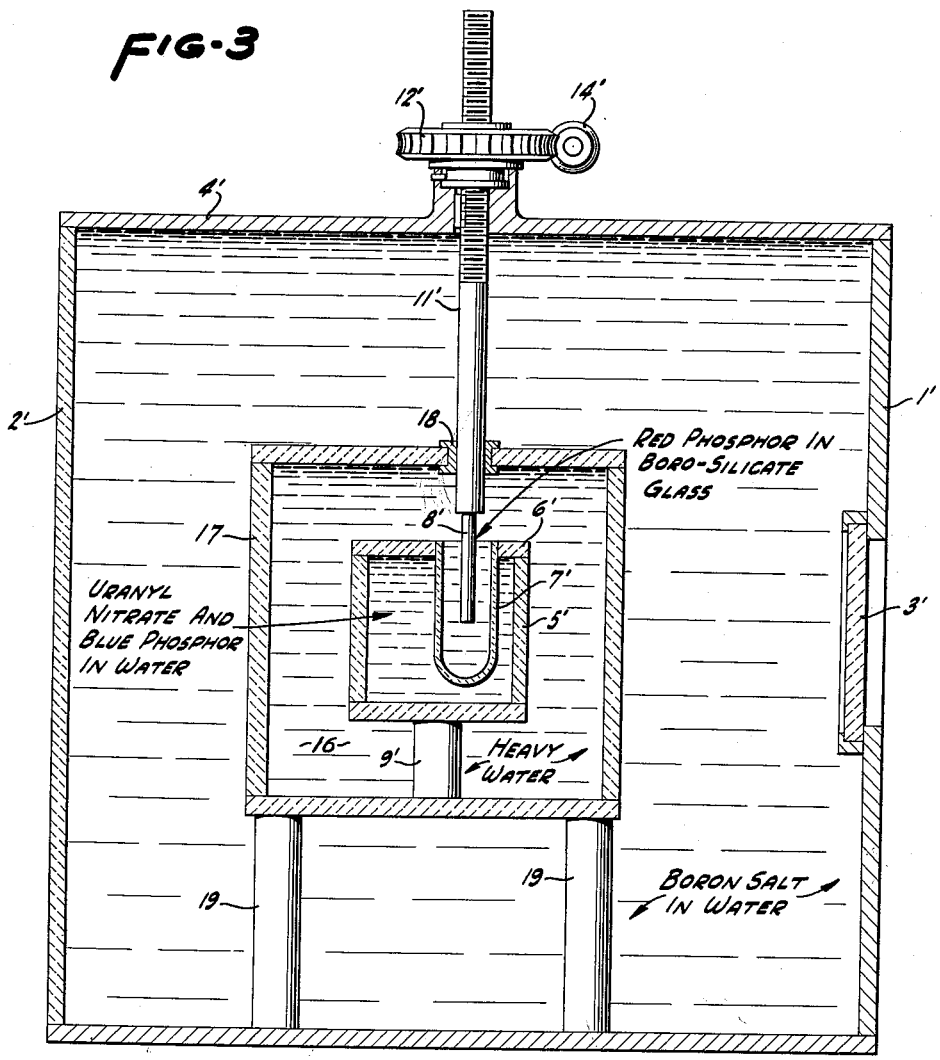

United States Patent Office 3,110,656
Patented Nov. 12, 1963

3,110,656
EDUCATIONAL NUCLEAR REACTOR
Mark Muir Mills, deceased, late of Danville, Calif., by Pauline Riedeburg Mills, executrix, Alamo, Calif.; said Pauline Riedeburg Mills, now by change of name Pauline Riedeburg Plesset, assignor of twenty-five percent to Lippincott, Ralls & Hendricson, San Francisco, Calif., a partnership
Filed Feb. 11, 1959, Ser. No. 792,586
11 Claims. (Cl. 204—193.2)

This invention relates to nuclear reactors primarily suited for educational, experimental and demonstration purposes as distinct from such purposes as the generation of useful power. The objects of the invention are to provide a reactor wherein the flux densities of various invisible, particulate and electromagnetic radiations developed in the reaction are made visible so that the effects of changing various parameters involved in the reactions taking place can be clearly observed.

The principal elements of a typical nuclear reactor may include one or more cores containing fissionable material that enters into the reaction, a moderator and neutron reflector that surrounds the core, a control rod or rods (which need not necessarily be of rod-like shape but may, for example, be plates), and shielding for absorbing stray radiations of various kinds, particularly neutron and gamma radiations, for the protection of observers and operators from the deleterious effects of such radiations.

In accordance with the present invention, each of the elements described takes the form of a solution or suspension that is transparent or substantially so, including, in the term solution, solid solutions and colloidal solutions as well as liquid crystalloidal solutions. The several elements (control rods excepted) are disposed as nested, substantially concentric cells. Where liquid solutions are used, the solid barriers defining the cells and separating them are transparent, at least in part, with transparent portions alined so as to give a clear line of sight from the exterior of the reactor into the core; where solid solutions are employed the cells may be self-defining. In addition to the primary materials exercising the functions of core, control rod, reflector and shield, there are included, in one or more of the solutions constituting these elements, small amounts of luminescent materials (e.g., phosphors or dyes) that will emit light responsive to the invisible radiations present within that particular portion or element of the reactor. All such luminescent materials, which emit light due to causes other than high temperature, are commonly referred to as phosphors. Preferably, where more than one of the elements is loaded with such luminescent materials, those used in the various elements are chosen to emit light of different colors so that an observer can tell, by the color of light emitted, the true source of the invisible radiation and its distribution. In certain circumstances the functions of the reflector and shield can be combined, and it is also possible to load any one of the elements of the reactor with more than one luminescent material, such that the different materials emit light of different colors responsive to radiations of different types, and thus provide means for distinguishing between the two principal radiations emanating from a nuclear reactor; namely neutron and gamma radiations.

All of the above will be developed further in the following detailed description of several possible embodiments of the invention, this description being illustrated by the accompanying drawings wherein:

FIG. 3 is a somewhat schematic, vertical section, not drawn to scale, of another embodiment wherein the reflector and shield are disposed in separate cells.

It is well known that certain isotopes of the chemical elements are more advantageous than others for use in certain parts of a nuclear reactor, and that the chemical elements and compounds employed may be enriched with certain isotopes. For example, uranium and its compounds, when employed as the fissionable material of the reaction, may be enriched with the isotope $U^{235}$; and "heavy" water, or deuterium oxide, may at times be advantageously employed rather than ordinary water. Since such isotope preferences and substitutions are well known to those skilled in the art, they will not be discussed in detail here. Hence, in the following description, references to uranium and its compounds are intended to include any desired mixture of the several uranium isotopes, and the term water includes deuterium oxide as well as ordinary water and any desired mixture of the two. The same considerations apply to other chemical elements and compounds that may be employed; the choice of isotopes is governed by known principles of nuclear engineering.

Figure 1:
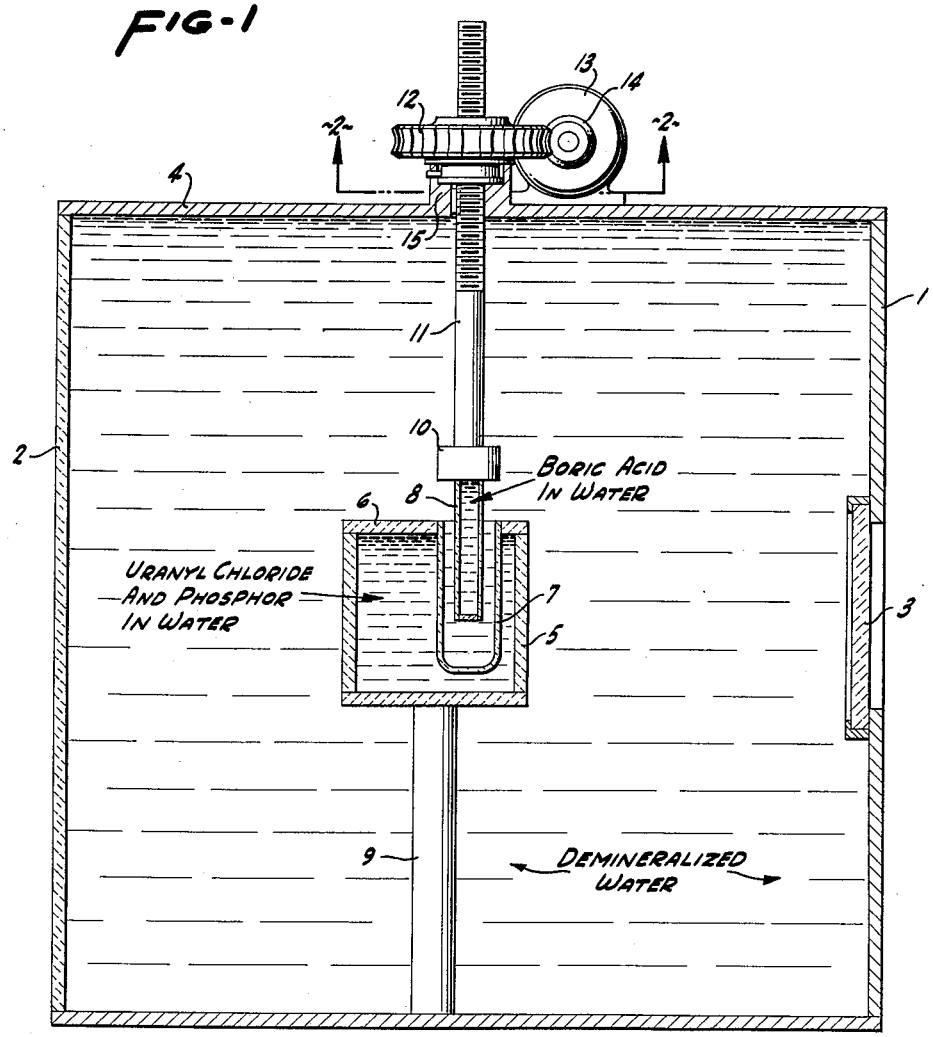
FIG. 1 is a somewhat schematic, vertical section, not drawn to scale, of a simple embodiment of this invention wherein the reflector and shield are combined in a single cell.

In the form of the apparatus illustrated in FIG. 1, the outer cell of the device is a large, liquid-tight tank 1, the dimensions of which are approximately those of a cube twelve feet on a side. The tank may be constructed either of metal or of glass. For many purposes, the all-glass tank is to be preferred, as it permits simultaneous observation of the phenomena within the reactor by a maximum number of persons. If it is constructed of metal, observation windows are provided. That shown is of compromise construction: the front face 2 of the tank is of plate glass; the bottom and three other sides are of steel plate, each provided with an observation window 3. The front face of the tank could obviously be the same construction as the other three sides if desired. Because of the large size required, the expense of an all-glass tank is very considerable; an all-steel tank (except for the windows) is less expensive and less subject to damage. In the present instance, the tank has a cover 4, which may be of metal, glass, wood or other material—if it is of an opaque material it also may be provided with windows. The cover is not a strictly necessary feature; it serves, however, to prevent evaporation or contamination of the liquids within the tank and also, in the present case, supports certain of the operating structures. Various structural details and modifications are obvious, and therefore are not illustrated or described.

Mounted substantially concentrically within the tank 1, there is a central cell 5. This is a cubical glass tank, the construction of which may be substantially that of an ordinary glass aquarium, such as is used for tropical fish. It is completely sealed, being provided with a glass cover plate 6 from which there depends a re-entrant thimble, or recess, 7 for receiving a control rod 8. The central cell 5 is supported on a column 9, preferably of glass, extending upward from the bottom of the tank, but the cell could equally well be suspended from the tank cover 4 is desired. The central cell 5 is preferably in the form of a cube, approximately one foot in each dimension. The thimble 7, like the cell 5 itself, is of glass and has an internal diameter of approximately one inch. Glass parts, in addition to being transparent, can have the advantage of minimum distortion of flux patterns.

The control rod 8 is mounted so that it may be introduced into or retracted from the thimble 7 by control apparatus, preferably located external to tank 1. The control rod may advantageously be of borosilicate glass, as illustrated in FIG. 3, or it may take the form of a thin-walled glass tube containing a solution of a boron compound—for example, a solution of boric acid or borax in water—as illustrated in FIG. 1. A solution of a cadmium compound is also effective for control purposes. The control rod may also contain, in solution or suspension, one of the many materials that are luminescent responsive to invisible radiations. Which materials are best for the purpose depends upon a number of factors that will become apparent hereinafter.

At this point it should suffice to say that if a solid borosilicate glass is employed as a control rod, a phosphor or one of the other materials that can be employed to render glass fluorescent responsive to radiation is held in solid solution or suspension within the glass itself. If, on the other hand, the control rod takes the form of a liquid solution within a hollow tube, the luminescent material may be one of the fluorescent dyes or a salt that is fluorescent in the liquid solution. Which material is used also depends upon whether a boron-bearing or cadmium-bearing solution is employed within the control rod. Furthermore, the luminescent material may be omitted altogether from the control rod, and incorporated only in other parts of the reactor.

Both boron and cadmium are neutron absorbers wherein the absorption results in the emission of radiation. The emission from cadmium comprises a highly penetrating gamma ray that can excite luminescence at relatively large distances from its point of origin. Absorption of a neutron by boron, however, gives rise to an alpha particle and a hydrogen nucleus of short range, as a result of which the luminescence is localized within the control rod and its source is clearly evident and not to be confused with that due to radiation from other sources. For present purposes boron-containing control rods are to be preferred.

Figure 2:
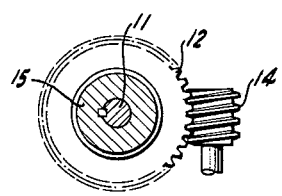
FIG. 2 is a sectional detail taken along line 2—2 of FIG. 1.

The control rod is secured by means of a collar 10 to the lower end of a vertical lead screw 11, which runs through the internally threaded center of a gear 12 which is driven by a reversible electric motor 13 and a worm 14, all mounted on top of cover 4, for raising and lowering the control rod 8 at will. The lead screw 11 has a flat side, key channel, or the like, best shown in FIG. 2, cooperating with a collar 15 and mating therewith to prevent rotation of screw 11 with internally threaded gear 12.

In operation, the cell 5 is filled with a solution of fissionable material. This solution may, for example, be uranyl chloride, with water as the solvent and moderator. This material is about 66 percent by weight of uranium; approximately one kilogram of uranium is required to give the desired effect, which would require approximately 1.5 kg. of the salt dissolved in sufficient water to fill the cell 5. Uranium used in the formation of the salt should be enriched with $U^{235}$ to the extent of about 20 to 25 percent of the latter isotope.

In addition to the uranium salt in the solution within cell 5, there is also dissolved a luminescent material that emits light responsive to an invisible radiation (e.g., the highly charged fission fragments) present in the reactor core; and, as in the case of the control rod, this material may either be a fluorescent, inorganic salt plus an activator, or a fluorescent dye. It is generally desirable that the luminescent material within cell 5 should emit light of a color different from that emitted by the luminescent material, if any, incorporated in the control rod. By way of example, cell 5 only may contain luminescent material, such as a known fluorescing solute of 2,5-diphenyloxazole in p-dioxane plus water, which emits a blue-green light when excited by the invisible radiations resulting from nuclear reactions within the cell 5. Thus, visible radiations are produced which simulate the Cerenkov light observed at higher power levels, while operating at lower power levels where Cerenkov light is ordinarily not apparent.

The solvent used for the uranium solution in cell 5 need not necessarily be water; but, to function well as a moderator, it should be rich in hydrogen or carbon; e.g., a compound or mixture of compounds of the paraffin series, such as kerosene, is satisfactory.

Finally, the tank 1 is filled with demineralized water, which may or may not contain fluorescent material. In the form of the invention shown in FIG. 1, the water in the outer tank serves the dual purposes of reflector and moderator for slowing down and returning neutrons escaping from the cell 5, returning a portion of the neutrons to the cell 5 to take part in further reactions, and as a shield for protecting operators and observers from neutron and gamma radiation. The rather large size of the tank, particularly in comparison to the size of the cell 5, makes water effective for both purposes even though it is not particularly opaque to either type of radiation.

As to the neutron radiation, the atoms of ordinary hydrogen in water may either reflect the neutrons or absorb them, becoming atoms of the heavy isotope, deuterium. Before reaching the periphery of the tank, the probability is that any neutron would have engaged in many collisions, and with each collision its probability of capture by a nucleus becomes greater; with great enough depth, therefore, ordinary water becomes a very effective neutron shield.

As to the gamma radiation, its absorption is approximately proportional to the product of the density of the material penetrated times its depth, and the radiation is further attenuated as a result of the inverse square law. Since the reactor described is intended to develop only a few (e.g., one to ten) watts power, the shielding described is adequate to give protection against both types of radiation.

It has been mentioned that the water in the outer cell may or may not be loaded with fluorescent indicator, depending upon circumstances. It may, for example, be desired to observe invisible radiation flux patterns in the outer cell, in which case it should contain a luminescent material to make such patterns visible. On the other hand, it may be desired to observe primarily luminescence originating either in the reactive cell 5, or in the control rod 8, in which case the luminescent material may be omitted from the outer cell. It should be obvious that if the primary object of study is a specific element of the apparatus, the fluorescent indicator may profitably be omitted from others to avoid any masking or dispersive effect on the light emitted by the particular element under study. In accordance with the present invention, at least one of the reactor elements must contain such a luminescent indicator.

The reactor thus far described is obviously a compromise in that the same material is used for both reflector and shield, and this material is not the best for either purpose. A somewhat better although more expensive arrangement is shown in purely diagrammatic form in FIG. 3.

In FIG. 3, the innermost cell 5' may be identical in structure with that already described. By way of example, it may contain an aqueous solution of uranyl nitrate and a blue-emitting phosphor such as 2,5-diphenyloxazole. In this embodiment, the innermost cell is surrounded by a first intermediate cell 16, comprising a 2.5 foot cube of heavy water contained in a second intermediate cell 17 composed of lead glass approximately 6 inches in thickness, which serves as a shield for gamma radiation. The cell 16 of heavy water, wherein a large portion of the hydrogen present is the isotope deuterium, which is more effective than ordinary hydrogen in the reflection of the neutrons and does not result in any appreciable neutron capture, serves as a reflector for confining neutrons to cell 5'. The control rod 8' is manipulated as before by means of a lead screw 11', an unthreaded portion of which passes through a conventional fluid seal 18 in the top of cell 17. The outer tank 1' can take any of the forms that have already been described, but its dimensions may be somewhat smaller—say 9 feet on a side—if so desired. The inner cell 5' is supported concentrically within cells 16 and 17 by glass column 9', and cell 17 is supported concentrically within tank 1' on columns or struts 19, which may be of metal or glass.

The tank 1' is filled with water in which a boron salt is dissolved to make it more effective in the capture of neutrons escaping from the cell 5'. Since the effective agent for this purpose is the boron, any boron compound that is sufficiently soluble, and otherwise unobjectionable, may be employed.

Any or various ones of the several reactor elements described may be loaded with fluorescent indicators, as has already been discussed; if such indicators are used in several different cells, they should usually be selected to fluoresce in different colors to render differentiation between the various possible sources of light easier. For example, a blue-fluorescing material may be dissolved within cell 5', as hereinbefore explained, and a red-emitting phosphor may be dissolved in or dispersed through the boro-silicate glass control rod 8'.

Although it has been mentioned that the fluorescent indicators may be omitted from one or more of the cells in the apparatus for better observation of specific phenomena, this is by no means always necessary. Where fluorescence is occurring at several levels or depths within the reactor, its source, although not necessarily its distribution within such source, is evidenced by its color; provided that the materials used in the various cells fluoresce in different colored lights. The color observed from a fluorescence deeper within the reactor will be mixed, additively, with the light from superposed layers; a green fluorescence, for example, with a red fluorescence superposed upon it (or vice versa) may appear as any shade between an olive green through yellow to a deep orange, depending upon the relative amounts of light emitted of the primary hues. Blue and green fluorescence can combine to give colors such as blue-green or cyan, while red and blue can combine to give effects from crimson through magenta to blue or violet. A weak fluorescence may, however, be wholly masked in contrast with a more powerful fluorescence of a different color so that its contribution to the observed hue is too slight to be noticeable.

Also to be taken into account is the effect of light scattering is superposed layers. The preferred materials used in the construction of the reactor are truly transparent. When the reactor is in operation, however, gas bubbles may be generated to an extent that makes the liquids in one or more of the cells translucent rather than truly transparent, although still light-transmitting. When this occurs, it is still possible to get a considerable amount of information as to the distribution of fluxes within the various elements of the reactor; the core will always be observed through supervening layers in the materials in the outer cells but the way the radiation falls off in these outer cells can still be observed by observing their outer portions, more distant from the core. It will be clear, however, that if a specific effect is to be studied in detail, it can be done more readily when luminance in one cell is not confused, at least in part, by either transmitted or scattered light from a different cell.

It will be evident that many modifications are possible with the two reactors that have been described in some detail. For example, the cell 17 of FIG. 3 may be made of ordinary glass and a larger tank employed to absorb the gamma radiation, as in FIG. 1. Another possibility is to use ordinary glass for the second or reflector cell, and use a metal tank armoured with sheet lead as a final shield against the gamma radiation except for the windows which should, in this case, be of heavy lead glass.

Further, while cubical cells have been described and are preferable, cylindrical, or even spherical cells are quite possible. Such curved cells have, however, the disadvantage that the contents within the several cells will in general have different coefficients of refraction to light, with the result that the cells act as lenses and distort the observed fields. Therefore, although the use of cylindrical cells, in particular, would have certain advantages structurally, if they are used it is preferable to give them at least flat window areas through which what happens within them can be observed undistorted by such lens effects.

Mention has been made of the fact that various types of solutions may be used in the respective cells. This is particularly true of the innermost cell, where the uranium salt employed may be in solid solution in glass or in a transparent plastic, such as methyl methachrylate ("Plexiglass") or one of the epoxy resins. Either of these materials has the advantage that reactions can take place within them without the formation of bubbles that may interfere with observation. It may be noted that some, although not all, of the uranium salts are fluorescent when in solution, and therefore, in this case at least, uranium may serve as its own indicator.

With regard to the outer cells, where the reflector and shield are combined, it is possible to use kerosene or one of the heavier paraffin oils in place of water, but this would not ordinarily be done because the material is more expensive and because of the fire hazard in the large volume of inflammable oil. The fact that such an oil can be used, however, should not be ignored.

The list of fluorescent indicators suitable for use within the various cells of the apparatus is so extensive that the enumeration of all or even a small part of the possible combinations would be impossible. There is an extensive literature on this subject, both as to dyes and as to inorganic phosphors and activators. Certain of these dyes are water-soluble, others are alcohol-soluble or oil-soluble. For example, "Luminescence of Solids" by Humbolt W. Leverenz (John Wiley and Sons, Inc., 1950) lists numerous materials, including data as to whether they can be excited to luminescence by ionic bombardment (e.g., by alpha particles) low-energy photons (visible or ultraviolet light) or high-energy photons (gamma rays). Manufacturers of various fluorescent dyes catalog these dyes frequently under trade names that give little or no indication as to their actual compositions but do indicate the color of fluorescence induced by various types of radiation and their solubility. Possible permutations as between solvent, indicator, and type of radiation is practically unlimited.

Particularly within cell 5, the quenching of luminescence by dissolved uranium salts must be taken into consideration. For example, a fluorescing solute of 2,5-diphenyloxazole (5 grams/liter dissolved in p-dioxane plus 20% water) exhibits a quantum yield of about 1 photon per 100 electron volts when bombarded by the highly charged fission fragments. This yield has been observed to decrease to about 15% with the addition of 15 grams/liter of uranium nitrate. Nevertheless, a typical "water boiler" core (having about 200 grams/liter of uranium in a 5 liter volume) operating at a 1 watt power level will yield enough light for observation in a darkened room. Raising the reactor power to 100 watts will make the blue glow visible in a normally lighted room.

The specific examples given herein are not intended as limitations upon the scope of the invention but merely as illustrations; all intended limitations are specifically set forth in the accompanying claims.

What is claimed is:

1. A nuclear reactor for educational and experimental purposes, comprising a plurality of nested cells of successively larger size, at least a portion of each of said cells being light-transmitting and such light-transmitting portions being alined to provide a line of sight from the exterior of the outermost to the interior of the innermost of said cells, the said innermost cell having a recess for receiving a control rod, a control rod adapted to fit into said recess, means for advancing and retracting said control rod therein, a fissionable material in solution within the innermost of said cells, and a phosphor in solution in at least one of said cells, said phosphor being a material that is luminescent under excitation by invisible radiations produced as a result of the fissioning of said fissionable material, whereby the flux patterns of such invisible radiations are made visible.

2. A reactor as defined in claim 1, wherein at least the alined, light-transmitting portions of said cells have substantially flat walls.

3. A reactor as defined in claim 1, wherein said control rod comprises a glass tube containing a solution of a neutron-absorbent material.

4. A reactor as defined in claim 1, wherein said control rod comprises a rod of boro-silicate glass.

5. A reactor as defined in claim 1, comprising two different phosphors that are luminescent under excitation by invisible radiations produced as a result of the fissioning of said fissionable material, one of said phosphors being in solution in said innermost cell and the other of said phosphors being in solution in said control rod, said different phosphors being luminescent in different colors of emitted light.

6. A nuclear reactor comprising a plurality of substantially concentric cells, the innermost of said cells comprising a closed, substantially cubical, glass box having a reentrant pocket formed therein, a control rod shaped to fit into said pocket, means for advancing and retracting said control rod, a transparent solution of fissionable material within said innermost cell, a transparent hydrogen-containing liquid within the next-to-innermost cell, and a phosphor that is luminescent under excitation by invisible radiations produced as a result of fissioning of said fissionable material, said phosphor being in solution in one of said cells, said next-to-innermost cell having a solid wall at least a portion of which is transparent.

7. A nuclear reactor comprising a substantially cubical tank having side walls at least portions of which are transparent, a smaller, substantially cubical, hollow, closed, transparent cell mounted substantially concentrically within said tank, means supporting said cell within said tank, said cell having a transparent thimble depending from its top to form a reentrant cavity extending downwardly therein, a neutron-absorbing control rod extending downwardly into said cavity, means for raising and lowering said control rod at will, a first, transparent body of liquid filling said cell, a fissionable material dissolved in said first body of liquid, a phosphor also dissolved in said first body of liquid, said phosphor emitting visible light responsive to excitation by charged fission fragments produced by fissioning of said fissionable material, and a second body of liquid substantially filling said tank.

8. A nuclear reactor for educational and experimental purposes, comprising core, reflecting and shielding elements disposed as a plurality of cells, one within another, the core cell being innermost and containing sufficient fissionable material for the occurrence of self-supporting nuclear fission reactions, the remaining cells having transparent portions alined to provide a line of sight extending from outside the reactor inward to the core cell, means for controlling the nuclear fission reactions of said fissionable material, a substantially transparent solution within one of said cells and in view from outside the reactor, said solution comprising a phosphor that is luminescent when excited by invisible radiations resulting from the nuclear fission reactions of said fissionable material, whereby the pattern of such invisible radiations is made visible.

9. A nuclear reactor for educational and experimental purposes, comprising a plurality of cells disposed one within another, having transparent parts alined so that the interior of the innermost cell is in view from outside the reactor, said innermost cell containing a substantially transparent solution comprising sufficient fissionable material for the occurrence of self-supporting nuclear fission reactions, and means for controlling the nuclear fission reactions of said fissionable material, said solution additionally comprising a phosphor that is luminescent when excited by invisible radiations resulting from the nuclear fission reactions of said fissionable material, whereby the pattern of such invisible radiations within said innermost cell is made visible.

10. A nuclear reactor for educational and experimental purposes, comprising a plurality of tanks, one within another, having transparent walls providing a line of sight from outside the outermost tank into the interior of the innermost tank, transparent liquids substantially filling said tanks, sufficient fissionable material for the occurrence of self-supporting nuclear fission reactions, said fissionable material being in solution in the liquid filling said innermost tank, neutron-absorbing material, means for moving said neutron-absorbing material into and out of proximity to said fissionable material for controlling the nuclear fission reactions, and a phosphor that is luminescent when excited by invisible radiations resulting from the nuclear fission reactions of said fissionable material, said phosphor being in solution in the liquid filling one of said tanks, whereby the pattern of such invisible radiations within the tank containing said phosphor is made visible.

11. A nuclear reactor as in claim 10, additionally comprising a second phosphor that is luminescent when excited by invisible radiations resulting from the nuclear fission reactions of said fissionable material, said second phosphor being in solution in the liquid filling another one of said tanks, the two phosphors being in different tanks and emitting light of different colors.

References Cited in the file of this patent

UNITED STATES PATENTS

| | | |
|---|---|---|
| 2,608,661 | Zinn | Aug. 26, 1952 |
| 2,736,815 | Marshall | Feb. 28, 1956 |
| 2,747,105 | Fitzgerald et al. | May 22, 1956 |
| 2,762,165 | Fulkerson et al. | Sept. 11, 1956 |
| 2,782,158 | Wheeler | Feb. 19, 1957 |
| 2,811,487 | Stanton | Oct. 29, 1957 |
| 2,840,522 | Young et al. | June 24, 1958 |
| 2,868,992 | Monk | June 13, 1959 |
| 2,905,826 | Bonner et al. | Sept. 22, 1959 |
| 2,945,305 | Strickler | July 19, 1960 |
| 2,984,744 | Lynch | May 16, 1961 |

OTHER REFERENCES

Nucleonics, vol. 10, No. 11, November 1952, pp. 56, 57.

Proceedings of the International Conference on the Peaceful Uses of Atomic Energy, vol. II, Geneva, August 8–20, 1955, New York, U.N., 1956, pp. 392–394.

Brennan et al.: Review of Scientific Instruments, vol. 27, No. 2, February 1956, page 112.